(12) United States Patent
Trika et al.

(10) Patent No.: US 10,877,668 B2
(45) Date of Patent: Dec. 29, 2020

(54) STORAGE NODE OFFLOAD OF RESIDUAL PART OF A PORTION OF COMPRESSED AND DISTRIBUTED DATA TO A SECOND STORAGE NODE FOR DECOMPRESSION

(71) Applicant: Intel Corporation, Santa Clara, CA (US)

(72) Inventors: Sanjeev N. Trika, Portland, OR (US); Jawad B. Khan, Portland, OR (US)

(73) Assignee: Intel Corporation, Santa Clara, CA (US)

(*) Notice: Subject to any disclaimer, the term of this patent is extended or adjusted under 35 U.S.C. 154(b) by 82 days.

(21) Appl. No.: 16/211,059

(22) Filed: Dec. 5, 2018

(65) Prior Publication Data
US 2019/0114108 A1    Apr. 18, 2019

(51) Int. Cl.
G06F 3/06 (2006.01)

(52) U.S. Cl.
CPC ............. *G06F 3/061* (2013.01); *G06F 3/067* (2013.01); *G06F 3/0635* (2013.01); *G06F 3/0608* (2013.01)

(58) Field of Classification Search
CPC ........ G06F 3/061; G06F 3/0635; G06F 3/067; G06F 3/0608
See application file for complete search history.

(56) References Cited

U.S. PATENT DOCUMENTS

| | | | | |
|---|---|---|---|---|
| 6,154,811 | A * | 11/2000 | Srbljic | G06F 12/0813 711/118 |
| 8,572,218 | B2 * | 10/2013 | Narayanan | H04L 69/04 341/106 |
| 9,411,815 | B1 | 8/2016 | Lu et al. | |
| 9,838,045 | B1 | 12/2017 | Bennett | |
| 2003/0218554 | A1 * | 11/2003 | McGuire | H03M 7/40 341/65 |
| 2009/0012982 | A1 | 1/2009 | Merchia et al. | |
| 2010/0036863 | A1 | 2/2010 | Koifman et al. | |
| 2010/0070741 | A1 * | 3/2010 | Col | G06F 9/30043 712/211 |

(Continued)

OTHER PUBLICATIONS

Choi et al, "Energy Efficient Scale-In Clusters with In-Storage Processing for Big-Data Analytics", MEMSYS, Oct. 2015.

(Continued)

*Primary Examiner* — William B Partridge
*Assistant Examiner* — Chie Yew
(74) *Attorney, Agent, or Firm* — Compass IP Law PC

(57) ABSTRACT

Techniques for offloading operations to access data that is compressed and distributed to multiple storage nodes are disclosed. A storage node includes one or more storage devices to store a portion of compressed data. Other portions of the compressed data are stored on other storage nodes. A storage node receives a request to perform an operation on the data, decompresses at least part of the portion of the locally stored compressed data, and performs the operation on the decompressed part, returning the operation result to a compute node. Any part that could not be decompressed can be sent with the request to the next storage node. The process continues until all the storage nodes storing the compressed data receive the request, decompress the locally stored data, and perform the operation on the decompressed data.

16 Claims, 7 Drawing Sheets

(56) References Cited

U.S. PATENT DOCUMENTS

| | | | |
|---|---|---|---|
| 2010/0191923 A1 | 7/2010 | Archer et al. | |
| 2010/0306498 A1 | 12/2010 | Shiga | |
| 2011/0040771 A1* | 2/2011 | Gilyadov | G06F 13/385 |
| | | | 707/754 |
| 2013/0339805 A1 | 12/2013 | Aho et al. | |
| 2015/0081650 A1 | 3/2015 | Lyle | |
| 2015/0106325 A1 | 4/2015 | Cole et al. | |
| 2016/0283141 A1 | 9/2016 | Hayes et al. | |
| 2017/0083632 A1* | 3/2017 | Kotoulas | G06F 16/2471 |
| 2018/0081798 A1 | 3/2018 | Alcantara et al. | |

OTHER PUBLICATIONS

Gaysse, "A Comparison of In-Storage Processing Architectures and Technologies", SDC Sep. 18.

Gu et al, "Biscuit: A Framework for Near-Data Processing of Big Data Workloads", 2016 ACM/IEEE Symposium on Computer Arch.

Jun et al, "BlueDBM: Distributed Flash Storage for Big Data Analytics", ACM Transactions on Computer Systems, vol. 34, No. 3, Jun. 2016.

Kang et al, "Enabling Cost-effective Data Processing with Smart SSD", Mass Storage Systems and Technologies (MSST), 2013.

Koo et al, "Summarizer: Trading Communication with Computing Near Storage", IEEE/ACM International Symposium on Microarchitecture, Cambridge, MA, USA, Oct. 2017.

Park et al, "In-Storage Computing for Hadoop . . . ", IEEE Transactions on Computers (TC), Jun. 2016.

Shadley, "Deployment of In-Storage Compute", SDC Sep. 18.

Wang et al, "SSD In-Storage Computing for Search Engines." IEEE Transactions on Computers (TC), Sep. 2016.

Wang et al. "SSD In-Storage Computing for List Intersection". In Proceedings of the 12th International Workshop on Data Management on New Hardware(DaMoN '16), in conjunction with SIGMOD, Jun. 2016.

Yang Seok Ki, "In-Storage Compute: an Ultimate Solution for Accelerating I/O-intensive Applications", FMS, Aug. 2015.

First Office Action for U.S. Appl. No. 16/211,108, dated Jan. 17, 2020, 19 pages.

First Office Action for U.S. Appl. No. 16/293,540, dated Jun. 17, 2020 18 pages.

\* cited by examiner

MasterController::ProcessOperation (Operation B, CompressedDataAddresses A)

500    Identify nodes N1 ... Nk that contain A

502    R0 = null stream // initial residue stream

504    S0 = default codec state when starting compression

506    N1.ProcessOperation(B, A, N2...Nk, S0, R0)

FIG. 5A

StorageNode::ProcessOperation (Operation B, CompressedDataAddresses A, NodeList Ns, CodecState Si-1, Residue bytes Ri-1)

550  Ai = Remove from head of A the set of addresses in this node
552  RemainingA = A - Ai
554  Ci = Read the compressed data at Ai
556  ProgramCodecState(Si-1)
558  (decompressed data Di, and residue bytes Ri) ← Decompress Ri-1 appended with Ci
560  Execute B on Di and send results to MasterController
562  If Ns is not empty
564      Si = Extract codec state
566      Ni+1 = Ns.extractHead
568      Ni+1.ProcessOperation (B, RemainingA, Ns, Si, Ri)

FIG. 5B

STORAGE NODE OFFLOAD OF RESIDUAL PART OF A PORTION OF COMPRESSED AND DISTRIBUTED DATA TO A SECOND STORAGE NODE FOR DECOMPRESSION

FIELD

The descriptions are generally related to computers and more specifically to computation in systems with distributed data storage.

BACKGROUND

With the emergence of cloud computing and other internet based high end computing implementations, new ways of implementing high performance computing systems are being investigated and pursued. The performance and/or efficiency of the computing racks used by high performance data centers are especially receiving more focused attention.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" or "examples" are to be understood as describing a particular feature, structure, and/or characteristic included in at least one implementation of the invention. Thus, phrases such as "in one embodiment" or "in one example" appearing herein describe various embodiments and implementations of the invention, and do not necessarily all refer to the same embodiment. However, they are also not necessarily mutually exclusive.

FIGS. 5A and 5B illustrate an example of pseudocode for techniques for offloading operations to be performed on compressed and distributed data.

Figure 1:
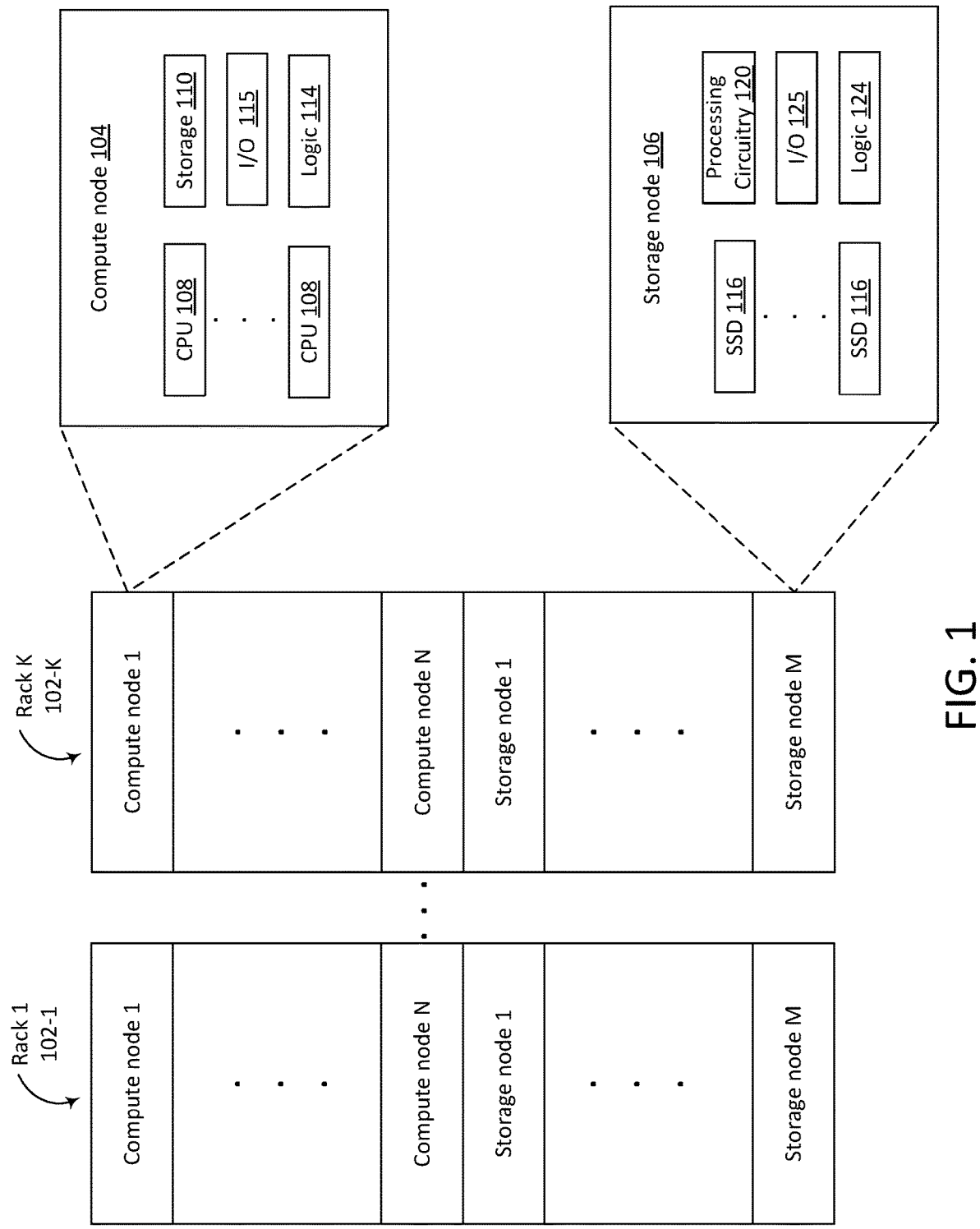
FIG. 1 illustrates an example of a disaggregated rack architecture in which storage offload techniques may be implemented.

Descriptions of certain details and implementations follow, including a description of the figures, which may depict some or all of the embodiments described below, as well as discussing other potential embodiments or implementations of the inventive concepts presented herein.

DETAILED DESCRIPTION

The present disclosure describes techniques for running storage offloads on data that is compressed and distributed.

Typical data centers are designed to achieve a high level of load balancing. To achieve load balancing, data is typically distributed amongst multiple racks, sleds, and storage devices. Data is also often compressed to reduce the size of data that is stored and transferred. It is also desirable to reduce power consumption and increase the speed and efficiency of data transfer and computation. One technique that can be used to improve efficiency and power consumption is to move compute operations closer to the storage devices where the data is stored. However, the compression and distribution of data makes it impossible for conventional techniques to offload operations to where the data is stored.

In contrast, techniques described in the present disclosure enable offloading operations in cases where the data is compressed and distributed. In one example, a system (e.g., one or more racks in a data center) includes a compute node and a storage node. For a given operation, the compute node determines which nodes store compressed data that is to be accessed by an operation. The compute node then sends a request to offload the operation to the storage node storing the first portion of the compressed data. The storage node attempts to decompress the first portion. If the storage node can decompress the first portion of compressed data, then the storage node performs the operation and provides the result back to the compute node. The storage node sends a request to offload to the second storage node with the compressed data, which sends a request to the third storage node, and so on.

If the storage node storing the first portion cannot decompress the data (e.g., due to the portion including an initial portion of a split token), the storage node sends a request to the next storage node storing the compressed data along with the non-decompressable portion. In one example, the codec state is also transmitted to the second storage node. The second storage node then decompresses the portion that the first storage node could not decompress (e.g., by combining the non-decompressable portion with the remaining portion of the split token and then decompressing). The second storage node can then perform the operation on the decompressed data and provide the result to the compute node. This process continues until each of the nodes storing compressed data has received the offload request and performed the operation. The compute node receives and processes the individual results from the storage nodes. The compute node can thus offload the operation to access compressed and distributed data, which can significantly reduce the amount of data transferred amongst nodes.

FIG. 1 illustrates an example of a disaggregated rack architecture in which storage offload techniques may be implemented. FIG. 1 illustrates an example of a system with K racks 102-1-102-K of computing resources, which may be used in a data center to store and process data. The racks 102-1-102-K can be in a same physical area, or in physically or geographically separate areas. In the illustrated example, each rack includes N compute nodes and M storage nodes, where N and M can vary in different racks. For example, for rack 102-1, N may be 10, but for rack 102-2, N may be 15. A node is a physical or virtual machine including or having access to one or more computing resources. Independent of whether a node is a physical or virtual machine, a node is a unique fault domain with respect to other nodes. A fault domain is an independent domain with no single point of failure (e.g., there is redundant cooling, power, and/or network paths). A storage node is a physical computer (e.g., server) including non-volatile storage. In the example illustrated in FIG. 1, the storage nodes 106 include solid state drives (SSDs) 116 to store data. The storage nodes 106 also include processing circuitry 120, which may include one or more of: a central processing unit (CPU), analog processing circuitry, a field programmable gate array (FPGA), an application specific integrated circuit (ASIC), accelerators, or other processing and/or control circuitry. A compute node is a physical computer including processors. For example, the compute nodes 104 include CPUs 108. The compute node 104 also includes storage 110, which can be a solid-state drive or other non-volatile storage. A compute node can be referred to as a compute sled, blade, shelf, chassis, server, appliance, machine, or computer. Similarly, a storage node can also be referred to as a storage sled, blade, shelf, chassis, server, appliance, machine, or computer.

The compute node illustrated in FIG. 1 includes CPUs 108, storage 110, input/output (I/O) interface logic 115 and logic 114. The I/O interface logic 115 can include hardware and/or software to enable communication both within the compute node and with other nodes. The logic 114 can include hardware, software, or both to implement the compression and offloading techniques described in this disclosure. The storage node 106 includes SSDs 116, processing circuitry 120, I/O interface logic 125, and logic 124. The logic 124 can include hardware, software, or both to implement the decompression and offloading techniques described in this disclosure. The nodes 104 and 106 can include different or additional resources than what is depicted in FIG. 1.

The nodes are communicatively coupled by one or more networks. For example, the nodes within the rack can be coupled via an Ethernet or proprietary local area network (LAN). The racks 102-1-102-K can include a switching hub (not shown in FIG. 1) to implement such a network. Multiple racks can be communicatively coupled to one another via gateways between each rack's network and another, external network that couples the racks to one another.

The nodes in FIG. 1 are disaggregated in the sense that data center hardware resources (e.g., compute, memory, storage, and network resources) can be packaged and installed individually in a rack. For example, storage resources are installed in the racks 102 as storage nodes or sleds, and compute resources are installed in the racks 102 as compute nodes or sleds. Thus, the compute nodes and storage nodes in FIG. 1 differ from conventional servers in that different nodes can include a different balance of computing resources and do not necessarily include all the components of a conventional server. In a conventional rack infrastructure, the computing resources have the granularity of an entire server computer. Thus, in a traditional infrastructure, a deficiency in resources can only be addressed by adding an entire server computer. As an example, to address a deficiency in CPU processing power, one or more additional servers would be added to the rack, which would increase the CPU processing power. However, the additional servers would also increase the storage resources and other power consuming elements, which may be unnecessary and even undesirable. Unlike conventional rack architecture, a disaggregated architecture enables addressing deficiencies in resources by adding more of the specific resources that are lacking without adding additional and unnecessary resources.

As mentioned above, data stored in a datacenter is typically stored across multiple devices, nodes, and or racks to improve load balancing. Data may also be compressed to reduce the resources needed to store and transmit the data. Compression of data may be lossless or lossy. An example of lossless compression involves identifying redundancies in data and encoding the data to eliminate or reduce the redundancy. After compressing data, the compressed data is typically divided into chunks that are then stored across multiple nodes. For example, the compressed data can be sharded and stored across multiple nodes, which can load balancing. Additional redundancies can be added to the data (e.g., after sharding) to improve availability. For example, shards can be erasure-coded to generate codes that are stored across multiple nodes. As mentioned above, it is also desirable to move computation close to where data is stored, however, conventional techniques for moving computation closer to the data is not feasible for data that is compressed and distributed amongst multiple nodes.

Figure 2:
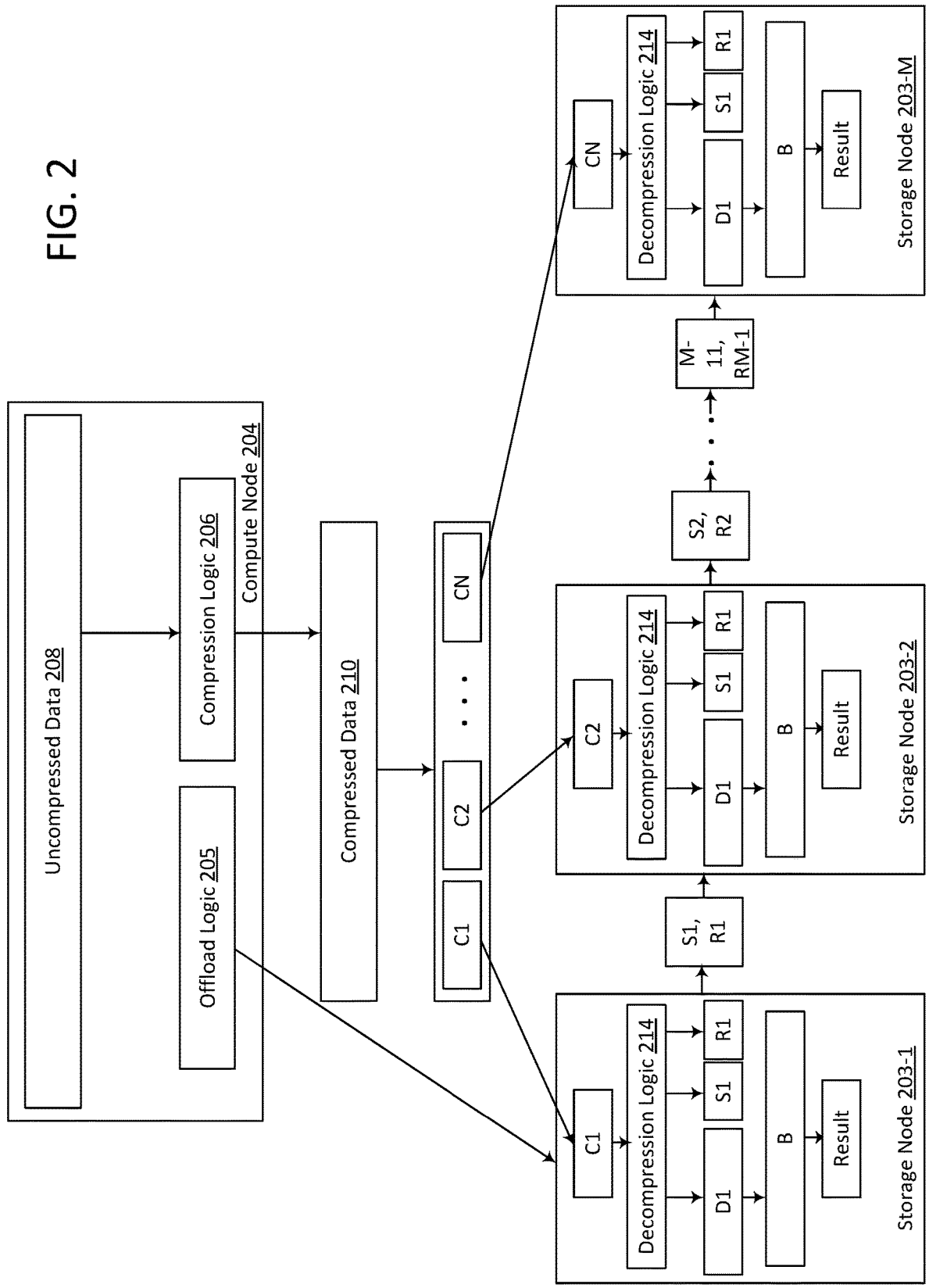
FIG. 2 illustrates a block diagram of a technique of running storage offloads on data that compressed and distributed.

FIG. 2 illustrates an example of a technique for offloading operations on data that is compressed and distributed.

The illustrated example shows how a compute node 204 compresses and distributes data for storage and how the compute node 204 can offload an operation on the compressed distributed data. The compute node 204 can be the same as, or similar to, the compute sled 104 of FIG. 1. The compute sled 204 is running an application that receives or generates uncompressed data 208. The application can be, for example, a virtual machine, an application running on a virtual machine, "master controller" software running on the compute node, or some other application. Prior to storing the uncompressed data 208, the compute node 204 compresses the data. To compress the data, the compute node 204 provides the uncompressed data 208 to compression logic 206. The compression logic 206 can be software running on the compute node 204, hardware, or a combination. The compression logic 206 compresses the incoming data 208 and outputs compressed data 210. The compression logic 206 can include a codec (coder-decoder) that encodes and compresses the incoming uncompressed data and decompresses coded compressed data. The compression logic 206 compresses the data using a compression algorithm.

A variety of compression algorithms can be used, some of which are more suitable for certain types of data. Some compression algorithms are "lossless." Lossless compression algorithms compress the data to ensure recovery of the uncompressed data without any loss of information. Examples of lossless compression algorithms include Lempel-Ziv (LZ), Lempel-Ziv-Welch (LZW), prediction by partial matching (PPM), Huffman coding, Run-length encoding (RLE), Portable Network Graphics (PNG), Tagged Image File Format (TIFF), and grammar or dictionary-based algorithms. Other compression algorithms are "lossy." Lossy compression algorithms compress data by discarding information that is determined to be nonessential. Thus, lossy compression is typically irreversible (i.e., data compressed with a lossy compression algorithm typically cannot be decompressed to its original form). Lossy compression algorithms are typically used for multimedia files (e.g., images, streaming video, audio files, or other media data). Lossless compression is typically used for files that need to be reconstructed without any loss of information. For example, it is typically undesirable to drop information from text files (e.g., emails, records, or other documents containing text) or program files (e.g., executable files or other program data files); therefore, such files are typically compressed with a lossless compression algorithm. Compression techniques involve storing information (e.g., codec state information) to enable decompression of the compressed data. The codec state information can include, for example, information identifying the type of compression algorithm, a model, a dictionary, and/or other information to enable decompression of the data.

Referring again to FIG. 2, after the compression logic 206 produces the compressed data 210, the compressed data 210 is broken up into multiple chunks C1-CN, which are written to multiple storage nodes 203-1-203-M. In one example, the compressed data 210 is sharded. Sharding involves dividing, by a "master node" or "initiator" a volume of data into multiple shards. In one example, an initiator can shard a 10 GB volume of data into 1000 10 MB shards. After sharding, the initiator sends the shards to multiple other nodes (targets). The target nodes receive the shards and can then perform erasure coding on the data prior to storage. To perform erasure coding, the target node divides each shard into logical-spans that are erasure coded and stored across multiple nodes and disks. The erasure coding adds redundancy that enables recovery of the data in the event of errors. Referring to the example above where a shard is 10 MB, the storage node divides each 10 MB shard into 100 100 kB logical-spans, which are then erasure coded to 140 100 kB codes. One or more of the codes are typically stored locally on the target node, and the target node sends the remaining codes to other nodes for storage. In the example above in which a shard is erasure coded to 140 codes, a portion of those code (e.g., 10) can be stored on the storage node, while the remaining 130 codes are sent to other storage nodes. Other techniques for adding redundancy and/or dividing and distributing the data for storage can be used. In the example illustrated in FIG. 2, the "chunks" of data C1-CN are sent to multiple storage nodes 203-1-203-M for storage.

After writing the compressed data to the multiple storage nodes 203-1-203-M, a program running on the compute node 204 is to perform an operation on the compressed data 210. In a conventional system, the data would be requested from all the nodes storing the data, and the nodes storing the data would send the data to the requesting node. The requesting node could then decompress the data and perform the operation on the decompressed data and write any changes to the data to the other storing nodes. Therefore, a significant amount of data is transferred amongst nodes in conventional systems.

In contrast, the technique illustrated in FIG. 2 enables offloading the operation to the nodes where the data is stored, which can significantly reduce data transfer amongst nodes. In the example illustrated in FIG. 2, the compute node issues a request to the node storing the first chunk C1. For example, offload logic 205 of the compute node 204 sends a request to offload an operation to the storage node 203-1. The storage node 203-1 receives the request (e.g., via input/output (I/O) interface logic) and sends the request to decompression logic 214. In one example, the decompression logic 214 includes a codec in software, hardware, or a combination of software and hardware. The decompression logic 214 of the storage node 203-1 attempts to decompress C1. In some examples, the decompression logic 214 successfully decompresses all or most of C1 to produce the decompressed data D1. For data that is not only compressed, but also encoded (e.g., with erasure coding), additional processing of that data may be involved before the operation can be performed locally on the data. For example, data that is erasure-coded is first decoded prior to decompressing. Therefore, the storage nodes may include logic (hardware, software, or both) to decode data in addition to decompressing the data. Data that is not successfully decoded may be sent to the requesting node to attempt to recover the data prior to decompression.

Referring again to decompression of the data, if some part of C1 is not successfully decompressed, the decompression logic identifies the residual compressed bits R1. In one example, the decompression logic 214 also produces codec state information S1. The codec state information S1 includes information to enable decompressing the remaining chunks C2-CN, and any non-decompressable bits of C1. In one example in which a dictionary-based compression algorithm is used, S1 includes the dictionary. Processing circuitry on the storage node can then perform the requested operation (B) on the decompressed data D1. The storage node sends the request to the next node, 203-2 (along with any other information that may be necessary to decompress the data), which sends the request to the next node, and so forth. The process continues until all the nodes 203-1-203-M storing the data C1-CN have received the request, processed the request, and provided any results back to the compute node 204.

Consider one specific example in which the compute node 204 is running an application that performs a search operation on the data 210 that includes text that has been compressed using a dictionary-based algorithm. Instead of requesting the data from the other nodes storing the data to be searched, the compute node 204 sends the search request to the node 203-1 storing the first chunk of data. The node 203-1 decompresses most of the data C1 to D1 and starts the search on the decompressed data D1. The storage node 203-1 accumulates the search-hits and returns them to the master controller of the compute node 204. The final few bytes in C1 may not be decompressable (e.g., due to being the initial portion of a split token in the compressed stream); the non-decompressable portion of C1 is referred to as R1 in FIG. 2. The storage node 203-1 packages the residue bits R1 that are not decompressable with the state of the codec S1 in to a package (S1, R1) and transmits the package along with the search request to the next storage node 203-2. In this example, the codec state S1 includes the dictionary state. In one example, the dictionary state is a small overhead (~4 kB) that allows the nodes storing the compressed data to work on the portions of compressed data independently. The storage node 203-2 programs its codec with the received S1 state and starts decompressing the stream represented by R1 followed by C2 (which is read locally on the storage node 203-2). The storage node 203-2 completes the search operation and returns accumulated results to the master controller of the compute node 204, and then passes the residue compressed bits R2 along with the resulting codec state S2 to the next node. As the codec of each node finds a match, it sends the results to the host compute node independently. This processing continues at the storage node, while only passing search results, commands, and state and residue over the network. The codec state and residue bytes typically have a significantly smaller size than the compressed data (e.g., ~4 kB for the codec state and 0-8 bytes for the residue versus gigabytes of compressed data), the amount of data transmitted over the network can be significantly reduced.

Figure 3:
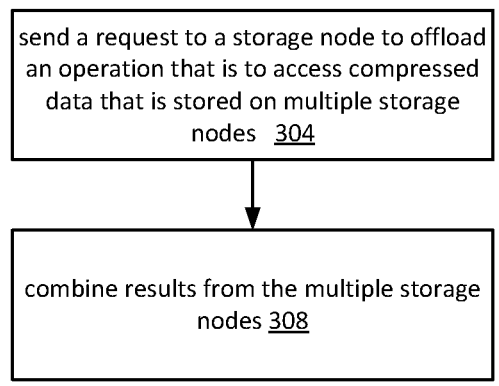
FIGS. 3 and 4 are flow charts of methods of offloading operations on data that is compressed and distributed.
Figure 4:
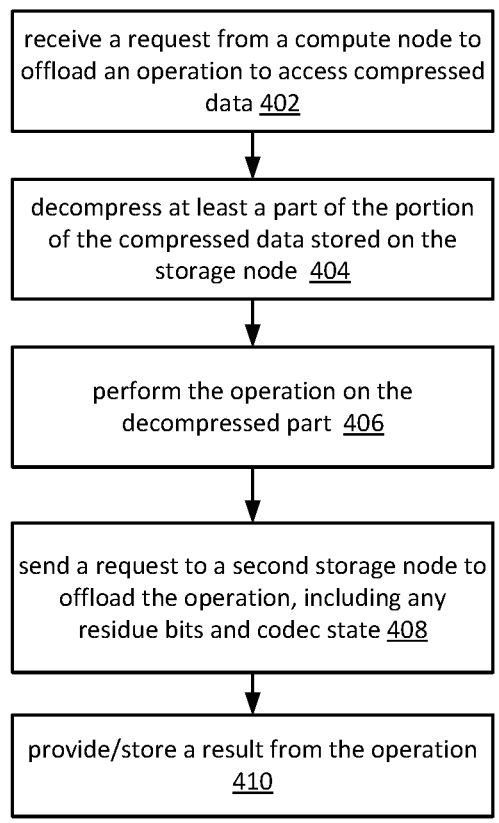

FIGS. 3 and 4 are flow charts of methods of offloading operations on data that is compressed and distributed. The method 300 of FIG. 3 illustrates a method performed at a compute node. The method 400 of FIG. 4 illustrates a method performed at a storage node. For example, referring to FIG. 1, the method 400 of FIG. 4 can be performed at a storage node 106 and the method 300 of FIG. 3 can be performed at a compute node 104. In the examples illustrated in FIGS. 3 and 4, the initiating node is the compute node and the node storing the data and performing the compute offload is the storage node. However, in other examples, the nodes have the same or similar resources and are simply nodes, sleds, or server computers rather than "compute nodes" and "storage nodes."

Referring first to FIG. 3, the method 300 begins with sending a request to a storage node to perform an operation on data that is compressed and distributed, at operation 304. For example, referring to FIG. 1, input/output (I/O) interface logic of a compute node 104 sends a command to a storage node 106 to offload some operation on data, a portion of which is stored on the receiving storage node. The storage node then sends the request to the next node storing the data. Each of the nodes storing data attempts to perform the operation and returns any results. The compute node then combines or in some other way uses the results from the storage nodes, at operation 308. Depending on the operation, the compute node may concatenate the results, average the results, perform some other operation on the results, or may simply access the results individually without further processing.

Referring now to FIG. 4, the method 400 begins with receiving a request from a compute node to offload an operation to access compressed data, at operation 402. For example, referring to FIG. 1, input/output (I/O) interface logic 125 of a storage node 106 receives a command from a compute node 104 to perform an operation on compressed data, a portion of which is stored on one or more SSDs 116 of the storage node. The storage node decompresses at least a part of the portion of the compressed data stored on the storage node, at operation 404. For example, referring to FIG. 1, logic 124 of the storage sled 106 attempts to decompress the portion of compressed data on the storage sled. After decompressing at least a part of the portion of compressed data stored on the storage node, the storage node performs the operation on the decompressed part, at operation 406. For example, referring to FIG. 1, the processing circuitry 120 of the storage sled 106 performs the operation on the decompressed data. The storage node also sends a request to another storage node to offload the operation, including any residue bits and codec state, at operation 408. For example, referring to FIG. 1, the I/O interface logic sends a request, residue bits, and codec state to another storage node. The storage node then provides or stores the result from the operation, at operation 410. In one example, the storage node sends the result directly to the compute node. In one example, the storage node stores the result (e.g., at a location specified by the compute node). In one example, each storage node sends the results back to the node from which it received the request, and the first storage node sends the combined results to the compute node. Regardless of how the results are provided back to the compute node, the methods 300 and 400 enable offloading a computation on compressed and distributed data without transferring all the compressed data chunks back to the compute node.

FIG. 5A is an example of pseudocode for a technique for offloading an operation on compressed and distributed data. The pseudocode of FIG. 5A illustrates a function called MasterController::ProcessOperation that can be performed, for example, by a compute node such as the compute node 204 of FIG. 2. For example, the MasterController::ProcessOperation function can be run by the offload logic 205 of the compute node 204. The MasterController::ProcessOperation function receives an offload-binary B (the operation to perform) and the addresses A of the compressed data.

The pseudocode of the MasterController::ProcessOperation function starts at line 500 with identifying the nodes N1-Nk that contain the data at addresses A. Determining which nodes store the data at addresses A varies depending on the implementation. For example, determining the location of data that is sharded involves either determining locations based on a shard map or algorithmically. If each shard is further erasure-coded, then the "owner node" for a given shard can determine the location of a code based on an erasure coding (EC) map or algorithmically. In one example, the physical location of codes is defined by a node number (e.g., sled number), disk number, and a sector range on that disk (e.g., logic block address (LBA) where the code is stored). The variables for the residue and codec state are initialized, at lines 502-504. Then, after the nodes storing the compressed data are identified, the request is sent to the node N1 storing the first chunk of compressed data, at line 506. The request includes the operation (B) to be performed, the address range A of the compressed data, the locations of the other nodes storing the compressed data, and the initialized residue and codec state.

FIG. 5B is an example of pseudocode for a technique for offloading an operation on compressed and distributed data. The pseudocode of FIG. 5B illustrates a function called StorageNode::ProcessOperation that can be performed, for example, by a storage node such as one of the storage nodes 203-1-203-M of FIG. 2. The function StorageNode::ProcessOperation receives the offload-binary B, the addresses A of the compressed data, the list Ns of nodes storing the compressed data, the codec state Si−1 from the previous node and the residue bytes Ri−1 from the previous node.

The pseudocode of the StorageNode::ProcessOperation function starts at line 550 with removing the head of the addresses A and storing the head in Ai. Ai then stores the set of addresses that are located at the present node. The remaining addresses (A-Ai) are then stored in RemainingA, at line 552. RemainingA stores the set of addresses that are located at other nodes. The storage node reads the compressed data at the addresses Ai and stores the compressed data in Ci, at line 554. At line 556, the codec state is programmed based on the codec state provided by the requesting node. The storage node then attempts to decompress the data Ci along with any residue data Ri−1 sent from the requesting node, at line 558. The output of the decompression is the decompressed data Di and residue bytes Ri if some data was not decompressable. The storage node then executes B on the decompressed data Di and sends results to the master controller, at line 560. If there are additional nodes storing the compressed data that have not yet received the request, then the request is sent to the next node in the list Ni+1 at lines 562-568. To send the request to the next node in the list, the current codec state is extracted at line 564, the next node identifier is determined at line 566, and the request is sent at line 568.

Figure 6:
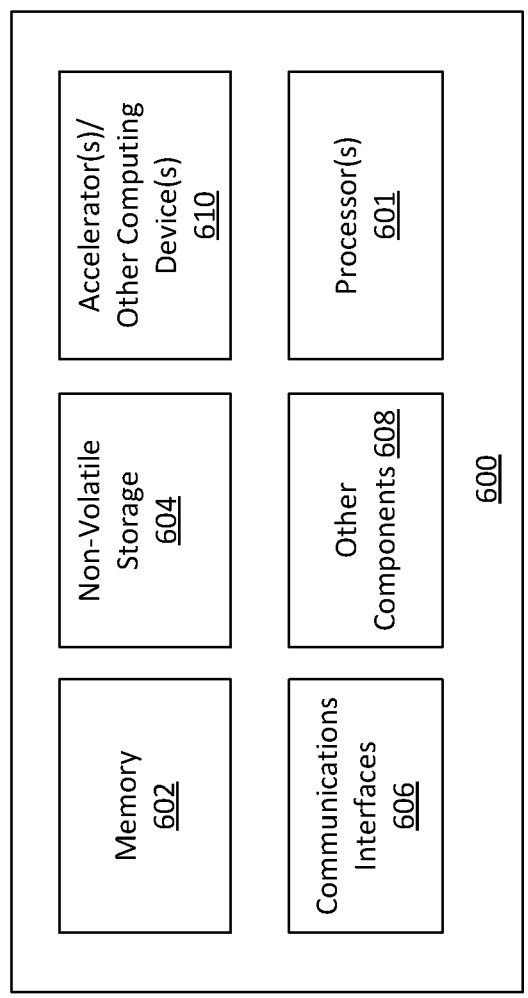
FIG. 6 provides an exemplary depiction of a computing system in which offloading techniques can be implemented.

FIG. 6 provides an exemplary depiction of a computing system 600 in which offloading techniques can be implemented. The computing system 600 can be, for example, user equipment, a computer, a personal computer (PC), a desktop computer, a laptop computer, a notebook computer, a netbook computer, a tablet, a smart phone, embedded electronics, a gaming console, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. As observed in FIG. 6, the system 600 includes one or more processors or processing units 601 (e.g., host processor(s)). The processor(s) 601 may include one or more central processing units (CPUs), each of which may include, e.g., a plurality of general-purpose processing cores. The processor(s) 601 may also or alternatively include one or more graphics processing units (GPUs) or other processing units. The processor(s) 601 may include memory management logic (e.g., a memory controller) and I/O control logic. The processor(s) 601 typically include cache on a same package or near the processor.

The system 600 also includes memory 602 (e.g., system memory). The system memory can be in the same package (e.g., same SoC) or separate from the processor(s) 601. The system 600 can include static random-access memory (SRAM), dynamic random-access memory (DRAM), or both. In some examples, memory 602 may include volatile types of memory including, but not limited to, RAM, D-RAM, DDR SDRAM, SRAM, T-RAM or Z-RAM. One example of volatile memory includes DRAM, or some variant such as SDRAM. Memory as described herein may be compatible with a number of memory technologies, such as DDR4 (DDR version 4, initial specification published in September 2012 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (LPDDR version 5, currently in discussion by JEDEC), HBM2 (HBM version 2, currently in discussion by JEDEC), and/or others, and technologies based on derivatives or extensions of such specifications. In one example, the memory 602 includes a byte addressable DRAM or a byte addressable non-volatile memory such as a byte-addressable write-in-place three dimensional crosspoint memory device, or other byte addressable write-in-place non-volatile memory devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

The system 600 also includes communications interfaces 606 and other components 608. The other components may include, for example, a display (e.g., touchscreen, flat-panel), a power supply (e.g., a battery or/or other power supply), sensors, power management logic, or other components. The communications interfaces 606 may include logic and/or features to support a communication interface. For these examples, communications interface 606 may include one or more input/output (I/O) interfaces that operate according to various communication protocols or standards to communicate over direct or network communication links or channels. Direct communications may occur via use of communication protocols or standards described in one or more industry standards (including progenies and variants). For example, I/O interfaces can be arranged as a Serial Advanced Technology Attachment (SATA) interface to couple elements of a node to a storage device. In another example, I/O interfaces can be arranged as a Serial Attached Small Computer System Interface (SCSI) (or simply SAS), Peripheral Component Interconnect Express (PCIe), or Non-Volatile Memory Express (NVMe) interface a storage device with other elements of a node (e.g., a controller, or other element of a node). Such communication protocols may be utilized to communicate through I/O interfaces as described in industry standards or specifications (including progenies or variants) such as the Peripheral Component Interconnect (PCI) Express Base Specification, revision 3.1, published in November 2014 ("PCI Express specification" or "PCIe specification") or later revisions, and/or the Non-Volatile Memory Express (NVMe) Specification, revision 1.2, also published in November 2014 ("NVMe specification") or later revisions. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification. Other examples of communications interfaces include, for example, a local wired point-to-point link (e.g., USB) interface, a wireless local area network (e.g., WiFi) interface, a wireless point-to-point link (e.g., Bluetooth) interface, a Global Positioning System interface, and/or other interfaces.

The computing system 600 also includes non-volatile storage 604, which may be the mass storage component of the system. Non-volatile types of memory may include byte or block addressable non-volatile memory such as, but not limited to, NAND flash memory (e.g., multi-threshold level NAND), NOR flash memory, single or multi-level phase change memory (PCM), resistive memory, nanowire memory, ferroelectric transistor random access memory (FeTRAM), magnetoresistive random access memory (MRAM) that incorporates memristor technology, spin transfer torque MRAM (STT-MRAM), 3-dimensional (3D) cross-point memory structure that includes chalcogenide phase change material (e.g., chalcogenide glass) hereinafter referred to as "3D cross-point memory", or a combination of any of the above. For these examples, storage 604 may be arranged or configured as a solid-state drive (SSD). The data may be read and written in blocks and a mapping or location information for the blocks may be kept in memory 602. The storage or memory of the system 600 can include processing circuitry, enabling some operations described above to be performed in compute-in-memory.

The computing system 600 may also include one or more accelerators or other computing devices 610. For example, the computing system 600 may include an Artificial Intelligence (AI) or machine learning accelerator optimized for performing operations for machine learning algorithms, a graphics accelerator (e.g., GPU), or other type of accelerator. An accelerator can include processing circuitry (analog, digital, or both) and may also include memory within the same package as the accelerator 610.

Examples of methods, apparatuses, and systems for off-loading operations on data that is compressed and distributed follow.

In one example, a storage node includes input/output (I/O) interface logic to receive a request from a compute node to perform an operation to access compressed data, a portion of the compressed data to be stored on the storage node and send a second request to a second storage node to perform the operation, another portion of the compressed data to be stored on the second storage node. The storage node also includes processing circuitry to decompress at least part of the portion of the compressed data on the storage node, perform the operation on the decompressed part of the compressed data, and provide a result from the operation.

In one example, the I/O interface logic is to send a part that is non-decompressable by the storage node to the second storage node for decompression. In one example, the non-decompressable part includes a portion of a split token in a compressed stream of data. In one example, the I/O interface logic is to send a state of a codec used to decompress the data to the second storage node. In one such example, the state of the codec includes a dictionary for decompression of the compressed data. In one example, the processing circuitry to provide the result is to cause the result to be stored on a storage device and/or cause the result to be sent to the compute node.

In one example, the processing circuitry to cause the result to be stored is to cause the result to be stored on the storage device at a location specified by the request from the compute node to perform the operation. In one example, the storage node includes one or more storage devices to store the portion of compressed data.

In one example, a system includes a compute node including one or more processors and a storage node to couple with the compute node. The storage node includes one or more storage devices to store a portion of compressed data, input/output (I/O) interface logic to: receive a request from the compute node to offload an operation, the operation to access the compressed data, and send a second request to a second storage node to offload the operation, the second storage node to store another portion of the compressed data, and processing circuitry to: decompress at least part of the portion of the compressed data, perform the operation on the decompressed part of the compressed data, and provide a result from the operation.

In one example, a method involves receiving, at a storage node, a request from a compute node to offload an operation, the operation to access compressed data, the storage node storing a portion of the compressed data. The method involves decompressing at least a part of the portion of the compressed data stored on the storage node, performing the operation on the decompressed data, and sending a second request to a second storage node to offload the operation, the second storage node storing at least another portion of the compressed data. The method involves providing a result from the operation to the compute node.

In one example, the method also involves sending a remaining non-decompressable part to the second node, the second node to decompress the remaining part. In one such example, the non-decompressable part includes a portion of a split token in a compressed stream of data. In one example, the method further involves sending a state of a codec used to decompress the data to the second storage node. In one example, providing the result involves storing the result on a storage device and/or sending the result to the compute node. In one example, storing the result on the storage device involves storing the result on the storage device at a location specified by the request from the compute node to offload the operation.

In one example, a method involves sending a request to a storage node to offload an operation, the storage node storing at least one portion of compressed data to be accessed by the operation, the storage node to send a second request to a second storage node to offload the operation, the second storage node storing another portion of the compressed data. The method involves accessing, and/or processing (e.g., combining) the results of the operation from the storage node and the second storage node.

In one example, an article of manufacture includes a computer readable storage medium having content stored thereon which when accessed causes one or more processors to execute operations to perform a method described herein.

In one example, a compute sled includes multiple processors, and an I/O interface to: send a request to offload an operation to a storage sled, the storage sled to store a portion of compressed data to be accessed by the operation, the storage sled to offload the operation to a second storage sled to store another portion of the compressed data. The compute sled includes logic to access results of the operation from the storage sled and the second storage sled.

Thus, techniques described herein can enable offloading operations when data is compressed and stored across multiple nodes.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., FPGA, PLD) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Flow diagrams as illustrated herein provide examples of sequences of various process actions. The flow diagrams can indicate operations to be executed by a software or firmware routine, as well as physical operations. In one example, a flow diagram can illustrate the state of a finite state machine (FSM), which can be implemented in hardware, software, or a combination. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various examples; thus, not all actions are required in every embodiment. Other process flows are possible.

To the extent various operations or functions are described herein, they can be described or defined as software code, instructions, configuration, data, or a combination. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine-readable storage medium can cause a machine to perform the functions or operations described and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters or sending signals, or both, to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Terms used above to describe the orientation and position of features such as 'top', 'bottom', 'over', 'under', and other such terms describing position are intended to clarify the relative location of features relative to other features, and do not describe a fixed or absolute position. For example, a wafer that is described as the top wafer that is above or over a bottom wafer could be described as a bottom wafer that is under or below a top wafer. Therefore, the illustrations and examples herein should be construed in an illustrative, and not a restrictive sense. The scope of the invention should be measured solely by reference to the claims that follow.

What is claimed is:

1. A storage node comprising:
input/output (I/O) interface logic to:
receive a request from a compute node to access compressed data, a first portion of the compressed data stored on the storage node,
and send the request to a second storage node to access, a second portion of the compressed data stored on the second storage node;
and processing circuitry to:
decompress at least part of the first portion of the compressed data,
perform an operation on a decompressed part of the first portion to yield a first result,
provide a first result of the operation to the compute node,
and send to the second storage node along with the request any residual part of the first portion of the compressed data that was not decompressed, the processing circuitry of the second storage node to:
decompress at least part of the second portion and the residual part of the first portion,
perform the operation on a decompressed part of the second portion and any decompressed part of the residual part of the first portion to yield a second result,
and provide the second result to the compute node.

2. The storage node of claim 1, wherein the residual part of the first portion of the compressed data that was not decompressed includes an initial portion of a split token used to decompress the compressed data.

3. The storage node of claim 1, wherein the I/O interface logic is to send to the second storage node along with the request a state of a codec used to decompress the at least part of the second portion and the residual part of the first portion.

4. The storage node of claim 3, wherein the state of the codec includes a dictionary for decompression of the compressed data.

5. The storage node of claim 1, wherein the processing circuitry is further to provide the first result and second result to the compute node to be stored on a storage device.

6. The storage node of claim 5, wherein the first result and second result is to be stored on the storage device at a location specified by the request from the compute node.

7. The storage node of claim 1, further comprising:
one or more storage devices to store any one or more portions of the compressed data.

8. A system comprising:
a compute node including one or more processors;
and storage nodes to couple with the compute node, a storage node including:
one or more storage devices to store a first portion of compressed data;
input/output (I/O) interface logic to:
receive a request from the compute node to access the compressed data,
and offload the request to a second storage node, the second storage node including one or more storage devices to store a second portion of the compressed data;
and processing circuitry to:
decompress at least part of the first portion of the compressed data,
perform an operation on a decompressed part of the first portion to yield a first result,
provide a first result from of the operation to the compute node,
and offload to the second storage node along with the request any residual part of the first portion of the compressed data that was not decompressed, the processing circuitry of the second storage node to:
decompress at least part of the second portion and the residual part of the first portion,
perform the operation on a decompressed part of the second portion and any decompressed part of the residual part of the first portion to yield a second result,
and provide the second result to the compute node.

9. The system of claim 8, wherein:
the one or more processors of the compute node are to determine which of the storage nodes store the compressed data;
and the compute node comprises input/output (I/O) interface logic to send the request to the storage node determined to store the compressed data, the request including information to identify next storage nodes determined to store the compressed data, the next storage nodes including the second storage node.

10. The system of claim 8, wherein the residual part of the first portion of the compressed data that was not decompressed includes an initial portion of a split token used to decompress the compressed data.

11. The system of claim 8, wherein the I/O interface logic of the storage node is to offload to the second storage node along with the request a state of a codec used to decompress the at least part of the second portion and the residual part of the first portion.

12. The system of claim 11, wherein the state of the codec includes a dictionary for decompression of the compressed data.

13. The system of claim 8, wherein the processing circuitry of the storage node is further to provide the first result and second result to the compute node to be stored on a storage device.

14. The system of claim 13, wherein the first result and second result is to be stored on the storage device at a location specified by the request from the compute node.

15. An article of manufacture comprising a non-transitory computer readable storage medium having content stored thereon which when accessed causes one or more processors to execute operations to perform a method comprising:
   receiving, at a storage node, a request from a compute node to access compressed data, the storage node storing a first portion of the compressed data;
   decompressing at least a part of the first portion;
   performing an operation on a decompressed part of the first portion to yield a first result;
   offloading the request to a second storage node along with any residual part of the first portion of the compressed data that was not decompressed, the second storage node storing a second portion of the compressed data;
   decompressing at least part of the second portion and the residual part of the first portion,
   performing the operation on a decompressed part of the second portion and any decompressed part of the residual part of the first portion to yield a second result,
   and providing the first result and second result to the compute node.

16. The article of manufacture of claim 15, wherein the residual part of the first portion of the compressed data that was not decompressed includes an initial portion of a split token used to decompress the compressed data.

\* \* \* \* \*